United States Patent Office 3,514,967
Patented June 2, 1970

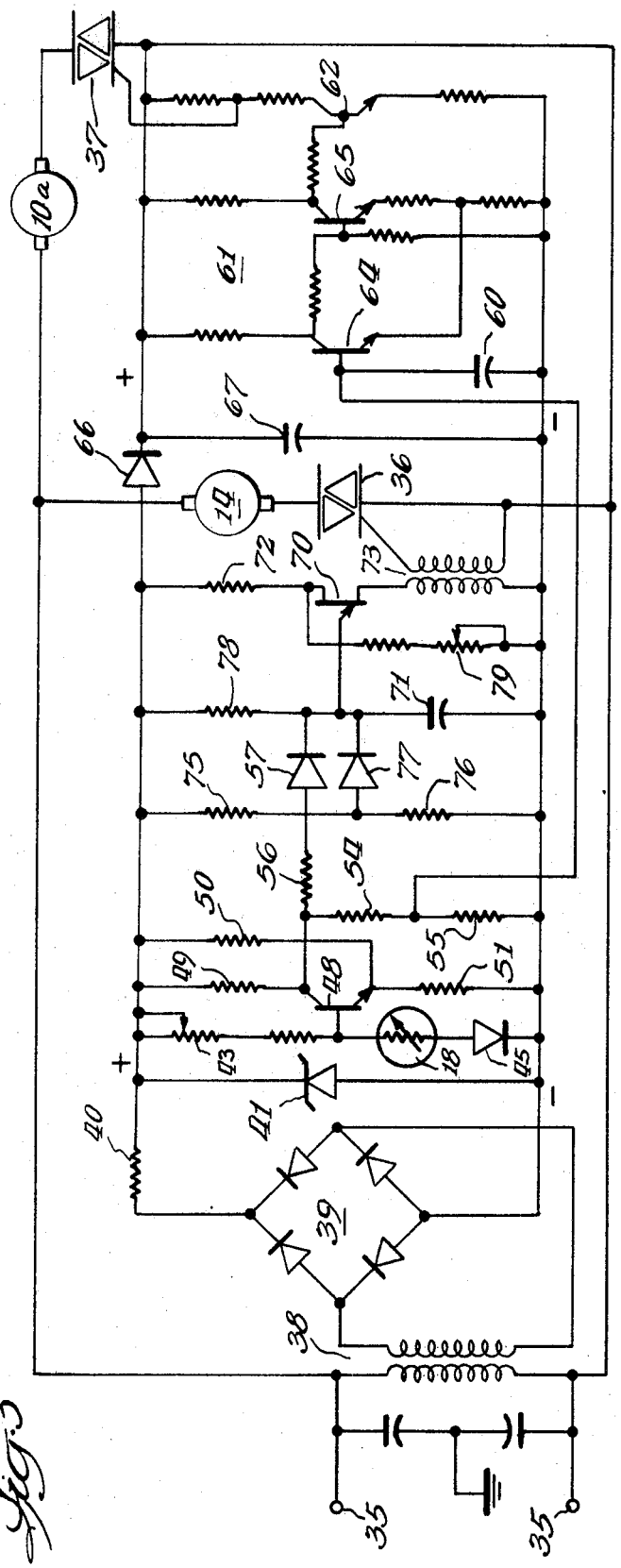
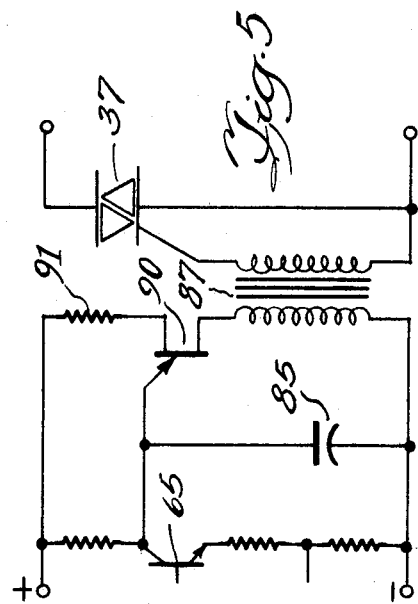
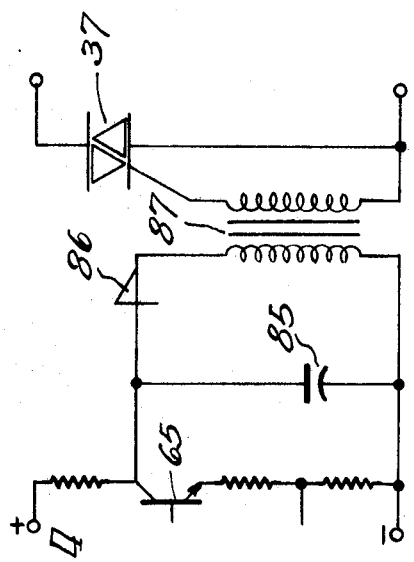

3,514,967
AIR CONDITIONER CONTROL
Donald R. Vander Molen, Stevensville, Mich., assignor to Whirlpool Corporation, a corporation of Delaware
Filed June 20, 1968, Ser. No. 738,592
Int. Cl. F25d 17/00
U.S. Cl. 62—180                                    8 Claims

ABSTRACT OF THE DISCLOSURE

An air conditioner control in which the compressor is cycled on and off and the fan speed is modulated. Several solid state control circuits for the compressor and fan motor are illustrated.

---

This invention relates to a control for refrigeration apparatus, and more particularly to a refrigeration control for regulating the speed of a fan motor and the operation of a compressor unit.

Refrigeration apparatus, such as a conventional room type air conditioner, has an evaporator through which air is passed by a fan to effect a heat exchange for cooling the air. A refrigerant fluid is circulated through the evaporator by a compressor which is cycled on and off by a control unit. The control unit is connected to a temperature sensor arranged to initiate operation of the compressor when the room air temperature rises above a preselected high value, and to discontinue operation of the compressor when the room air temperature falls below a preselected low value.

It has been suggested that the speed of operation of the fan motor for the evaporator may be varied in proportion to temperature, independent of the operation of the compressor circuit to vary system capacity. While such a control represents an improvement over prior controls, it does not produce a system having maximum efficiency at varying control settings.

In accordance with the invention, control of the evaporator fan motor speed is synchronized with control of the energization and deenergization of the compressor unit, to provide a system having improved cooling and dehumidifying efficiency over a wide range of control settings. The speed of the fan is preferably increased subsequent to the energization of the compressor to increase the cooling capacity of the apparatus. A desired temperature is maintained by varying the speed of the fan, and thus the system cooling capacity, within a controlled range. Since the compressor is continuously energized at this time, the evaporator remains cool in order to condense water vapor and hence dehumidify the air.

A principal object of the invention is the elimination of electromechanical relays, as by utilizing solid state switches.

Another object is to provide circuitry responsive to a change in the electrical impedance of the temperature sensitive element for activating the solid state switches.

One feature of the invention is the provision of a control including a regenerative trigger circuit responsive to the temperature sensitive circuit element to control the bidirectional switch in the compressor motor circuit. In one form of the invention, the regenerative trigger circuit is coupled to the bidirectional switch through a buffer amplifier.

Another feature of the invention is that the amplifier responsive to the temperature sensitive element is connected directly with a bistable pulse generator which may be coupled to the bidirectional switch through a pulse transformer or directly.

A further feature of the invention is that the pulse generator may be a silicon unilateral switch or a unijunction transistor connected with a resistance-capacitance circuit and to a circuit element whose conductive condition depends upon temperature. As the temperature rises and the conductive condition of the element changes, a pulse is produced which in turn triggers the bidirectional switch.

Further features and advantages will readily be apparent from the following specification and from the drawings, in which:

FIG. 3 is a schematic diagram of the control embodying the invention;

FIG. 4 is a schematic drawing of a pulse generator used in the control;

FIG. 5 is a schematic drawing of another pulse generator used in the control.

The invention is particularly intended for use in controlling a room air conditioner, and will be described in this environment. However, it may be used in other types of air conditioning apparatus.

Figure 1:
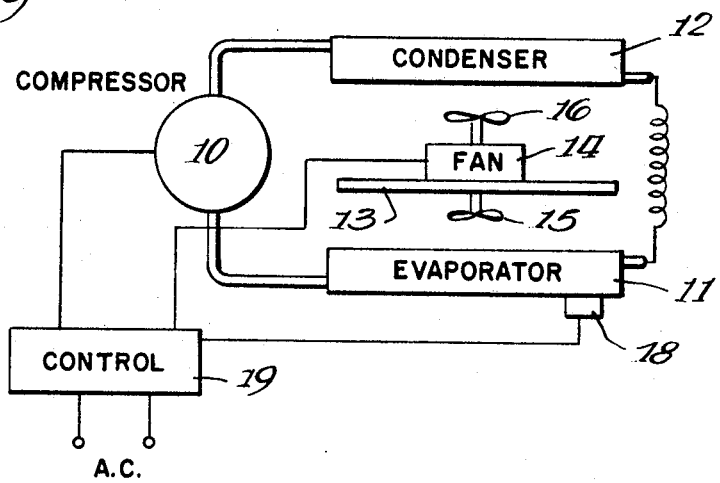
FIG. 1 is a block diagram of refrigeration apparatus controlled by the invention.

Turning now to FIG. 1, the air conditioner includes a refrigerating system comprising compressor 10, evaporator 11 and condenser 12. A suitable refrigerant flows from the compressor 10 to evaporator 11 where cooling takes place. The refrigerant passes to the condenser 12 and from there to the compressor, completing the cycle. In the usual installation, evaporator 11 is located within the space to be cooled and condenser 12 outside the space. The spaces are separated by a partition 13. A fan motor 14 drives a fan 15 inside partition 13 to move air across evaporator 11 and a fan 16 outside the partition which circulates air across condenser 12.

A temperature sensing element 18 is located in the path of air entering evaporator 11 and operates through a control 19 to actuate compressor 10 and fan motor 14. Briefly, a desired temperature for room air is selected (hereinafter called the set point temperature). When the temperature is low in comparison to the set point temperature, the compressor is inoperative and the fan motor runs at a low speed. When the room temperature is high with respect to the set point temperature, the compressor operates and the fan runs at a high speed. In the vicinity of the set point temperature, the compressor is operated and fan speed is modulated or varied gradually between low speed and high speed, to provide an accurate control over room air temperature.

Operating characteristics of the system are illustrated graphically by curves of compressor operation A, fan speed B and cooling capacity C. In each curve, temperature is plotted as the ordinate with increasing temperatures to the right. The set point temperature is indicated by the vertical dashed line $t_s$.

When compressor 10 is not operating at a temperature below $t_s$, and the temperature rises, the compressor is turned on when the temperature reaches $t_s$. The compressor then remains in operation for all temperatures above $t_1$ which is slightly below $t_s$, as one degree below. This is illustrated by curve 21.

The fan speed is maintained at a low level for low temperatures, as indicated by horizontal curve 22, and at a high level for high temperatures as indicated by horizontal curve 23. At intermediate temperatures, in the vicinity of $t_s$, the fan speed is varied between the low and high limits in accordance with temperature. The solid line curve 24 represents a condition in which the fan speed begins to increase at $t_s$. Broken line curve 25 represents a condition in which the fan speed begins to increase at a temperature below $t_s$ while broken line curve 26 shows the operation when the fan speed begins to increase at a temperature above $t_s$.

The curves C of cooling capacity (composites of curves A and B) illustrate the effect of changing the point at which fan speed change is initiated. The fan operating alone has no cooling capacity. When the temperature rises to $t_s$ and the compressor is initiated, the cooling capacity jumps to an intermediate level 29. For temperatures above $t_s$ (and following the solid line which corresponds with curve 24 in FIG. 2b), the cooling capacity increases gradually to a high level 30. Curves C indicate that the temperature range over which the cooling capacity is modulated is substantially greater when the variation of fan speed is delayed until the temperature exceeds the set point than when variation starts at or below the set point. If the temperature range over which modulation occurs becomes excessive, the control is generally considered unsatisfactory as most people are sensitive to a temperature variation in excess of two or three degrees.

Figure 2:
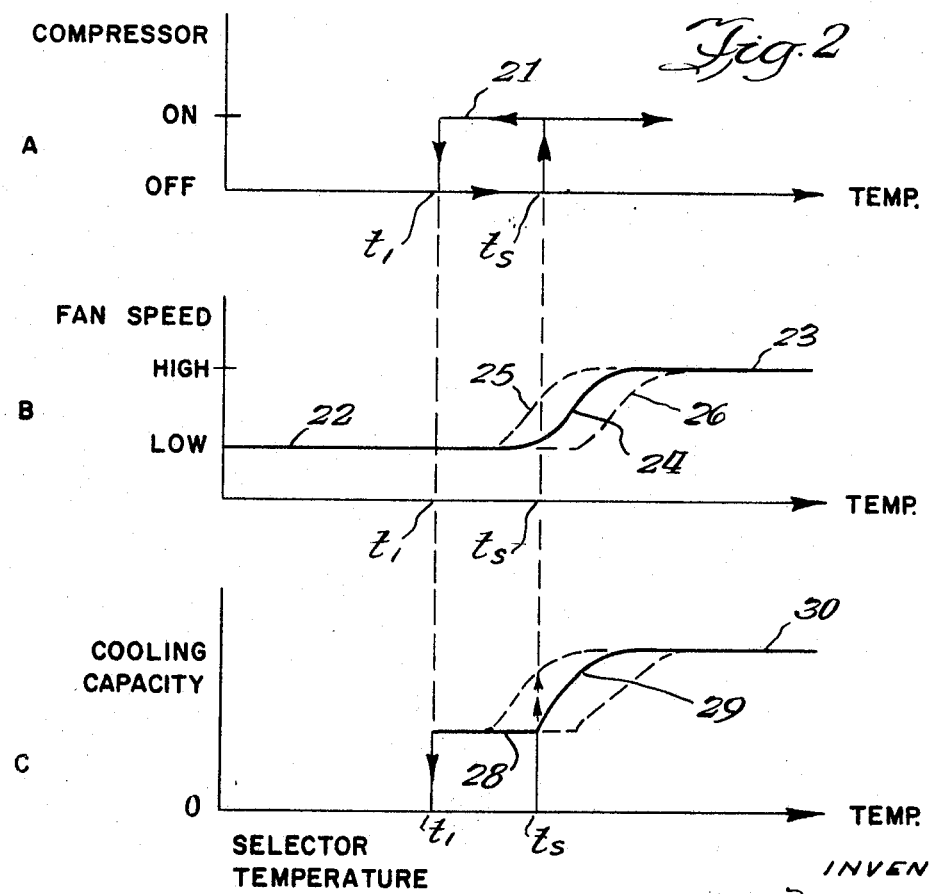
FIG. 2 is a set of curves illustrating the operating characteristics of the control over a limited range of temperatures.

During the following discussion of the various control circuits, it will be pointed out how the adjustments incorporated in the circuits permit variation of the operating characteristics of the system as illustrated by the curves of FIG. 2.

One embodiment of a control incorporating the invention is shown in FIG. 3. Terminals 35 are connected with a suitable source of power as 115 volts AC. Fan motor 14 is connected with the source of power through a triac gated bidirectional switch 36 while compressor motor 10a is connected with the source of power through a triac gated bidirectional switch 37. Stepdown transformer 38 provides a reduced voltage, as 24 volts, for operation of the control circuits. A full wave bridge rectifier 39 is connected with the secondary winding of transformer 38 and its output is clamped at 20 volts by a series resistor 40 and shunt connected Zener diode 41. The 120 cycle ripple contributes to the operation of the fan control.

Temperature sensitive element 18, a variable impedance thermistor, is connected in series with potentiometer 43, resistor 44 and diode 45 across the output of Zener regulator 41. A transistor amplifier 48 has its base connected to the junction between resistor 44 and temperature sensitive element 18. The collector of transistor 48 is connected with one side of the power supply through resistor 49 while the emitter is connected to the junction of resistors 50, 51, in series across the power supply. The values of the various resistors are selected to establish desired current and voltage levels for transistor amplifier 48. At temperatures below $t_s$, transistor 48 has a high collector current and a low collector voltage. At temperatures above the set point, the collector current decreases and the voltage increases to minimum and maximum values respectively. The set point may be selected by adjustment of potentiometer 43. This potentiometer preferably has a suitable calibrated control accessible to the user. The diode 45, in series with temperature sensing thermistor 18, provides temperature compensation for transistor amplifier 48. Resistors 50, 51 establish degenerative feedback at the emitter to stabilize amplifier 48.

The output of transistor amplifier 48 is derived from the collector electrode. A first output circuit includes resistors 54 and 55 which are connected in series and from the collector electrode to a terminal of the power supply. The compressor control signal is obtained from the junction between the two resistors. A second output is obtained through series resistor 56 and diode 57, for modulating the fan speed.

The compressor control signal is filtered by a capacitor 60 and applied to the input of a Schmitt trigger indicated generally at 61. The output of the Schmitt trigger is coupled through an isolation transistor 62 with the gate of triac 37. Briefly, when the temperature rises to the set point, conduction drops in transistor 48 and a positive signal at the collector is coupled to the Schmitt trigger. Transistor 62, which is normally cut off, conducts heavily upon actuation of the Schmitt trigger, in turn establishing a potential at the control element of triac 37 which causes it to conduct continuously.

More specifically, the bistable Schmitt trigger circuit 61 includes two stages, transistors 64 and 65, each supplied from a filtered source including diode 66 and filter capacitor 67. The detailed interconnection and operation of the trigger circuit are well known and will not be repeated here. It is sufficient for an understanding of the present invention that for temperatures below the set point, transistor 64 is cut off while transistor 65 is saturated. Upon an increase of the temperature above the set point, the signal from amplifier 48 starts a current flow through transistor 64 and the trigger circuit, through its regenerative action, rapidly drives transistor 64 to saturation and cuts transistor 65 off. This in turn causes transistor 62 to conduct heavily and drops the potential of the gate triac 37 below the potential of the base, causing it to conduct, energizing compressor motor 10a. When the temperature falls below the compressor shut-off, $t_1$, transistor 48 conducts more heavily and causes Schmitt trigger 61 to return to its initial condition, causing transistor 62 to be cut off and opening triac switch 37.

Transistor 48, through resistor 56 and diode 57, sets the pedestal for a ramp and pedestal phase control circuit for unijunction transistor 70 which in turn modulates operation of fan motor 14. The unijunction transistor has both bases connected in series across the Zener regulated power supply. The pulsatile nature of the full wave rectified supply voltage insures that the unijunction transistor (and fan motor triac 36) is rendered nonconductive each half cycle. The control element of the unijunction transistor 70 is connected across capacitor 71. One base of the unijunction transistor 70 is connected through resistor 72 with one side of the power supply while the other base is connected through the primary winding of pulse transformer 73 with the other side of the power supply. When unijunction transistor 70 is rendered conductive the current flow through pulse transformer 73 applies a pulse to the gate of triac 36 energizing fan motor 14.

As capacitor 71 is substantially discharged when unijunction transistor 70 fires, the charge rate of the capacitor determines the point in each half cycle at which the unijunction transistor fires, triggering the triac and energizing the fan motor. This in turn controls the fan motor speed. For temperatures below $t_s$, a minimum pedestal for the unijunction transistor control is established by a voltage divider comprising resistors 75 and 76 connected across the power supply with their junction connected through a blocking diode 77 with capacitor 71. At the start of each half cycle after diode 70 has been turned off, capacitor 71 charges above the minimum pedestal through resistor 78. When the voltage on capacitor 71 reaches the firing point, the transistor 70 is triggered and triac 36 turned on. At higher temperatures the voltage at the collector of the transistor amplifier 48 rises above the voltage at the junction between resistors 75 and 76 and establishes increasingly higher pedestal voltages which are applied to capacitor 71 through resistor 56 and blocking diode 57 to give a variable fan motor speed. Potentiometer 79, which forms a voltage divider with resistor 72, permits adjustment of the potential at the first base of unijunction transistor 70, varying the interbase voltage and thus the firing point of the unijunction transistor. This control varies the minimum fan speed.

An alternate circuit for triggering compressor control triac 37, in which buffer transistor amplifier 62 is eliminated, is illustrated in FIG. 4. Here the output stage 65 of Schmitt trigger 61 has a capacitor 85 connected in shunt therewith. A silicon unilateral switch 86 is connected in series with the primary winding of pulse transformer 87, across capacitor 85. The secondary winding of pulse transformer 87 is connected with the gate of triac 37. When the temperature is below the set point, transistor 65 conducts heavily and the voltage across capacitor 85 is low, When the temperature rises to the set point and the Schmitt trigger 61 is actuated, transistor 65 is cut off. Capacitor 85 charges until silicon unilateral switch 86 conducts, generating a pulse to trigger triac 37.

FIG. 5 illustrates a similar circuit using a unijunction transistor 90 in place of the silicon unilateral switch. The gate of the unijunction transistor 90 is connected across capacitor 85 while the two bases are connected across the power supply through a current limiting resistor 91 and the primary winding of pulse transformer 87. When the temperature reaches the set point and transistor 65 is cut off, capacitor 85 begins to charge until the firing point for the unijunction transistor is reached. When the transistor conducts, capacitor 85 discharges through the primary winding of the pulse transformer, triggering triac 37.

Figure 6:
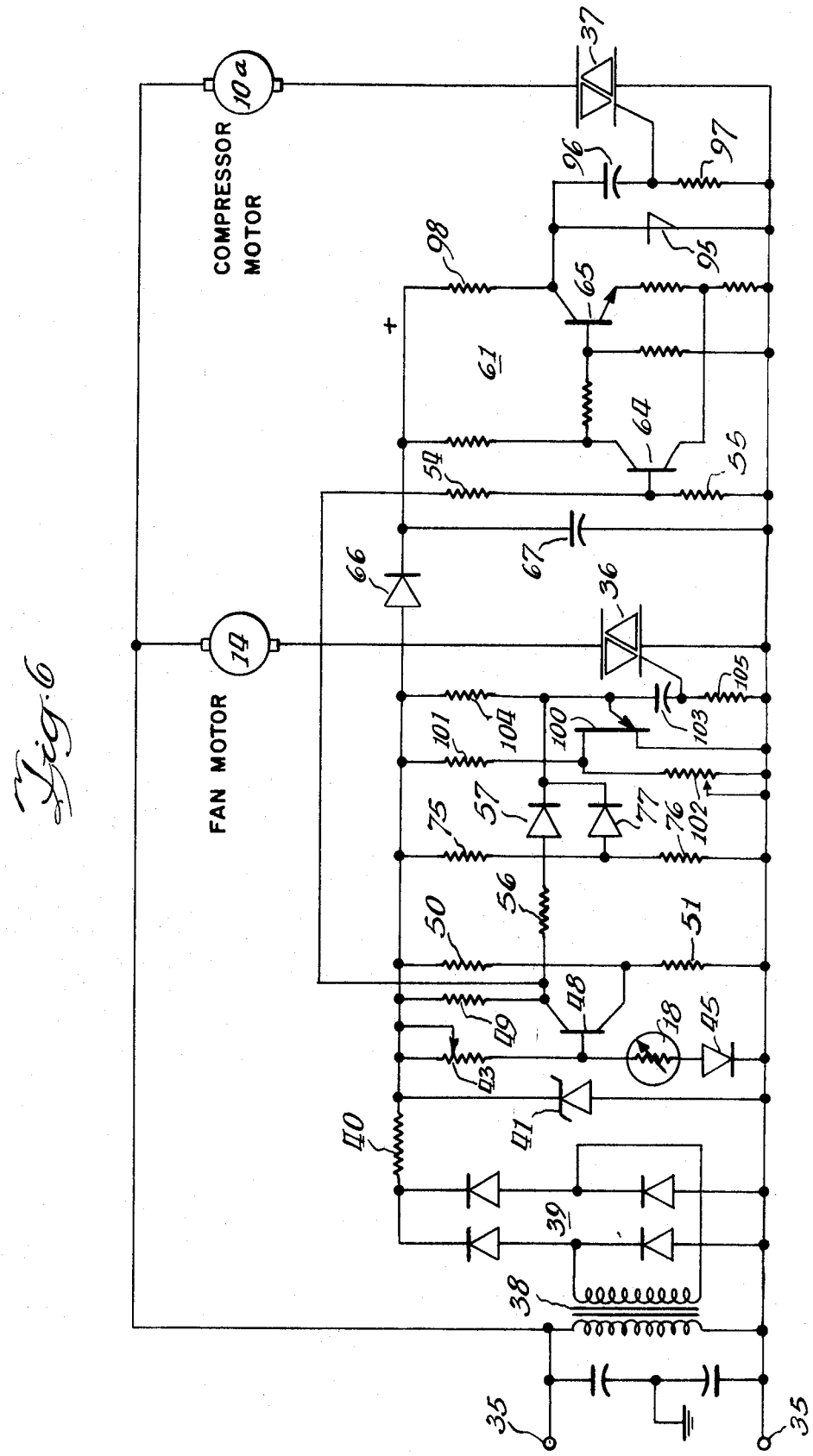
FIG. 6 is a schematic drawing of a modified control circuit.

In FIG. 6 another complete schematic for a modified control is illustrated. Elements which correspond with elements in FIG. 3 are given the same reference numeral and will not be described in detail.

The principal changes in the circuit of FIG. 6 as compared with the circuit of FIG. 3 are in the control circuits for triac 36 and triac 37. Both the buffer transistor amplifier 62 and the various pulse transformers are eliminated.

Considering first the control for triac 37, a silicon unilateral switch 95 is connected across Schmitt trigger output stage 65. Connected in parallel with the silicon unilateral switch is the series combination of capacitor 96 and resistor 97. The gate of triac 37 is connected to the junction between the capacitor and the resistor. For temperatures below the set point, transistor 65 conducts and the voltage across silicon unilateral switch 95 and thus the voltage on capacitor 96 are low. When the temperature rises and transistor 65 is cut off, capacitor 96 charges through resistor 97, 98. When the conduction point for silicon unilateral switch 95 is reached, capacitor 96 is discharged rapidly through resistor 97 providing the pulse necessary to trigger triac 37.

A similar control for triac 36 is provided by unijunction transistor 100. The transistor has one base connected to a voltage divider formed by resistor 101 and potentiometer 102 while the other base is connected to one side of the power source. The two pedestal forming circuits are connected with capacitor 103 which charges through resistors 104 and 105 connected from the capacitor to the power source. As was described in detail in connection with FIG. 3, capacitor 103 charges (through resistors 104, 105) until the conduction potential for unijunction transistor 100 is reached. Upon conduction of the transistor, capacitor 103 discharges rapidly forming a pulse across resistor 105 which is connected to the gate of triac 36. The pedestal voltage determines the fan speed in accordance with air temperature.

While I have shown and described certain embodiments of my invention, it is to be understood that it is capable of many modifications. Changes, therefore, in the construction and arrangement may be made without departing from the spirit and scope of the invention as defined in the appended claims.

The embodiment of the invention in which an exclusive property or privilege is claimed is defined as follows:

1. In a control for an air conditioner having refrigeration apparatus, including a compressor driven by a motor and a fan driven by a motor for circulating air through the refrigeration apparatus, and an electrical circuit element having an impedance sensitive to temperature, a motor control, comprising:
a first amplifier responsive to said temperature sensitive circuit element, having a first conductive state for temperatures below a desired level and a second conductive state for temperatures above said desired level;
a two-stage regenerative trigger circuit having a first stage connected with the output of said amplifier and responsive to a shift of the amplifier from the first to the second conductive state to shift the conductive state of a second stage;
a second amplifier connected with the second stage of said trigger circuit and having first and second conductive states, one for each conductive state of the second stage;
a source of alternating current; and
a bidirectional switch connected between said compressor motor and said alternating current source and responsive to the state of said second amplifier for passing alternating current to said motor.

2. The control of claim 1 wherein said two-stage regenerative trigger circuit comprises a Schmitt trigger in which the first and second stages are continuously in opposite conductive stages.

3. The control of claim 1 including a pulsating direct current power source for said first amplifier, and a shunt capacitor connected with the input to the first stage of said trigger circuit to filter the output of said first amplifier and provide filtered DC power to said second amplifier and said trigger circuit.

4. The control of claim 1 wherein the second stage of the triger circuit is conductive for temperatures below the desired temperature and is nonconductive for temperatures above the desired temperature, said second amplifier including a capacitor connected with the second stage of the trigger circuit and discharged when the trigger is conductive, a resistor through which the capacitor charges when the second stage is cut off, and a silicon unilateral switch connected across said capacitor and with the bidirectional switch, to couple a pulse thereto when the charge on the capacitor reaches the conduction level of the silicon unilateral switch.

5. The control of claim 4 including a pulse transformer having a primary winding connected in series with the silicon unilateral switch across said capacitor and a secondary winding connected wtih said bidirectional switch.

6. In a control for an air conditioner having refrigeration apparatus, including a compressor driven by a motor and a fan driven by a motor for circulating air through the refrigeration apparatus, and an electrical circuit element having impedance sensitive to temperature, a control for energizing one of said motors from an AC source, comprising:
an amplifier responsive to said temperature sensitive circuit element, having a first conductive state for temperatures below a desired level and a second conductive state for temperatures above said desired level;
bidirectional switch means connected between said one motor and said AC source for gating alternating current thereto when energized;
a trigger circuit effective when fired for energizing said bidirectional switch means;
a full wave rectified voltage supply; and
a firing point control for said trigger circuit including at least resistive means and a capacitor connected in series across said voltage supply, a voltage divider connected across said voltage supply and having a junction at which a portion of said full wave rectified voltage is available, a diode connected from said junction to said capacitor, and unidirectional conduction means connected from said amplifier to said capacitor for charging said capacitor in response to the conductive state of said amplifier, the sum charge on said capacitor controlling the firing of said trigger circuit.

7. The control of claim 6 wherein said unidirectional conduction means includes a second diode poled to pass voltage of the same polarity as the diode connected from said junction.

8. The control of claim 6 wherein said bidirectional switch means comprises a triac having a blocking state and a conductive state which allows both polarities of alternating current to pass through said triac to energize said motor.

References Cited

UNITED STATES PATENTS

| | | | |
|---|---|---|---|
| 3,267,994 | 8/1966 | Sones | 165—28 |
| 3,398,889 | 8/1968 | Bohannan | 62—180 |

WILLIAM J. WYE, Primary Examiner

U.S. Cl. X.R.

62—181, 183, 186

PO-1050
(5/69)

UNITED STATES PATENT OFFICE
CERTIFICATE OF CORRECTION

Patent No. 3,514,967      Dated    June 2, 1970

Inventor(s)    Donald R. VanderMolen

It is certified that error appears in the above-identified patent and that said Letters Patent are hereby corrected as shown below:

Column 6, line 21, in Claim 2, the word "stages"

should be --states--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents